US007788686B1

(12) United States Patent  (10) Patent No.: US 7,788,686 B1
Andrews  (45) Date of Patent: Aug. 31, 2010

(54) METHOD OF AND APPARATUS FOR DESCRIBING, PROMOTING, PUBLISHING, AGGREGATING, DISTRIBUTING AND ACCESSING LIVE CONTENT INFORMATION

(76) Inventor: Christopher C. Andrews, 1260 Payne Dr., Los Altos, CA (US) 94024

( * ) Notice: Subject to any disclaimer, the term of this patent is extended or adjusted under 35 U.S.C. 154(b) by 905 days.

(21) Appl. No.: 09/797,080

(22) Filed: Mar. 1, 2001

Related U.S. Application Data

(60) Provisional application No. 60/186,111, filed on Mar. 1, 2000.

(51) Int. Cl.
- H04N 7/10 (2006.01)
- H04N 5/445 (2006.01)
- H04N 7/16 (2006.01)
- G06F 3/048 (2006.01)
- G06F 15/16 (2006.01)

(52) U.S. Cl. .............. 725/32; 725/36; 725/42; 725/48; 725/138; 725/144; 715/715; 715/718; 709/217; 709/219

(58) Field of Classification Search ............ 725/32, 725/36, 40, 41, 48, 115, 138, 144; 715/715–718; 709/217, 219
See application file for complete search history.

(56) References Cited

U.S. PATENT DOCUMENTS

| | | | | |
|---|---|---|---|---|
| 5,253,275 A | * | 10/1993 | Yurt et al. ............... | 375/240 |
| 5,748,956 A | * | 5/1998 | Lafer et al. ............. | 715/863 |
| 5,852,435 A | * | 12/1998 | Vigneaux et al. ........ | 345/428 |
| 5,903,816 A | | 5/1999 | Broadwin et al. | |
| 5,920,700 A | * | 7/1999 | Gordon et al. .......... | 709/226 |
| 6,000,969 A | * | 12/1999 | Reichardt et al. ........ | 725/60 |
| 6,002,720 A | * | 12/1999 | Yurt et al. ............... | 375/240 |
| 6,006,241 A | * | 12/1999 | Purnaveja et al. ....... | 715/512 |
| 6,014,644 A | * | 1/2000 | Erickson ................. | 705/37 |
| 6,018,768 A | * | 1/2000 | Ullman et al. .......... | 709/218 |
| 6,081,830 A | * | 6/2000 | Schindler ................ | 709/204 |
| 6,088,703 A | * | 7/2000 | Kaneko .................. | 707/104.1 |
| 6,119,154 A | * | 9/2000 | Weaver et al. .......... | 709/219 |
| 6,133,912 A | * | 10/2000 | Montero ................. | 715/716 |
| 6,144,375 A | * | 11/2000 | Jain et al. ............... | 715/500.1 |
| 6,154,771 A | * | 11/2000 | Rangan et al. .......... | 709/217 |
| 6,173,317 B1 | * | 1/2001 | Chaddha et al. ........ | 709/219 |
| 6,177,931 B1 | * | 1/2001 | Alexander et al. ...... | 725/52 |
| 6,211,869 B1 | * | 4/2001 | Loveman et al. ....... | 345/723 |
| 6,240,555 B1 | * | 5/2001 | Shoff et al. ............. | 725/110 |
| 6,249,836 B1 | * | 6/2001 | Downs et al. ........... | 710/268 |
| 6,268,849 B1 | * | 7/2001 | Boyer et al. ............. | 725/40 |
| 6,287,199 B1 | * | 9/2001 | McKeown et al. ....... | 463/40 |

(Continued)

OTHER PUBLICATIONS

U.S. Appl. No. 09/500,080, filed Feb. 2000, Hassell et al.*

Primary Examiner—Son P Huynh

(57) ABSTRACT

An electronic program guide that assists a user to navigate through a variety of digital and analog feeds made available by digital television technology is provided. Features such as allowing the user to purchase items, allowing the user to choose the content of the display screen, enabling more efficient use of black areas, among others are provided. Default settings based on prior user settings is provided to allow for an automatically customized environment. This automatic customization may entail, for example, the automatic resizing of windows based on the user's prior preferences. Also provided is a feature that allows for the automatic activation of a local or remote application through the user's set-top box based on the content currently being viewed.

36 Claims, 8 Drawing Sheets

U.S. PATENT DOCUMENTS

| | | | |
|---|---|---|---|
| 6,308,327 B1* | 10/2001 | Liu et al. | 725/37 |
| 6,321,209 B1* | 11/2001 | Pasquali | 705/14 |
| 6,323,911 B1* | 11/2001 | Schein et al. | 348/552 |
| 6,339,842 B1* | 1/2002 | Fernandez et al. | 725/133 |
| 6,351,467 B1* | 2/2002 | Dillon | 370/432 |
| 6,353,929 B1* | 3/2002 | Houston | 725/20 |
| 6,357,042 B2* | 3/2002 | Srinivasan et al. | 725/32 |
| 6,421,062 B1* | 7/2002 | Higashio | 345/634 |
| 6,434,621 B1* | 8/2002 | Pezzillo et al. | 709/231 |
| 6,438,751 B1 | 8/2002 | Voyticky et al. | |
| 6,460,018 B1* | 10/2002 | Kasai et al. | 705/8 |
| 6,462,754 B1* | 10/2002 | Chakraborty et al. | 715/723 |
| 6,463,444 B1* | 10/2002 | Jain et al. | 707/104.1 |
| 6,490,567 B1* | 12/2002 | Gregory | 705/39 |
| 6,522,342 B1* | 2/2003 | Gagnon et al. | 715/716 |
| 6,526,580 B2* | 2/2003 | Shimomura et al. | 725/63 |
| 6,536,041 B1* | 3/2003 | Knudson et al. | 725/39 |
| 6,539,548 B1* | 3/2003 | Hendricks et al. | 725/109 |
| 6,564,380 B1* | 5/2003 | Murphy | 725/86 |
| 6,574,793 B1 | 6/2003 | Ngo et al. | |
| 6,587,123 B2* | 7/2003 | Ando et al. | 715/723 |
| 6,615,408 B1* | 9/2003 | Kaiser et al. | 725/112 |
| 6,637,032 B1* | 10/2003 | Feinleib | 725/110 |
| 6,668,246 B1* | 12/2003 | Yeung et al. | 705/57 |
| 6,668,377 B1* | 12/2003 | Dunn | 725/92 |
| 6,734,877 B1* | 5/2004 | Honda et al. | 715/721 |
| 6,735,487 B1* | 5/2004 | Marshall et al. | 700/90 |
| 6,769,127 B1* | 7/2004 | Bonomi et al. | 725/39 |
| 6,774,926 B1* | 8/2004 | Ellis et al. | 348/14.01 |
| 6,799,327 B1* | 9/2004 | Reynolds et al. | 725/42 |
| 6,816,628 B1* | 11/2004 | Sarachik et al. | 382/285 |
| 6,820,278 B1* | 11/2004 | Ellis | 725/80 |
| 6,857,131 B1* | 2/2005 | Yagawa et al. | 725/112 |
| 6,980,972 B1* | 12/2005 | Allibhoy et al. | 705/51 |
| 7,100,192 B1* | 8/2006 | Igawa et al. | 725/112 |
| 7,185,355 B1* | 2/2007 | Ellis et al. | 725/46 |
| 7,434,242 B1* | 10/2008 | Goode | 725/9 |
| 2001/0003846 A1* | 6/2001 | Rowe et al. | 725/47 |
| 2001/0025255 A1* | 9/2001 | Gaudian | 705/26 |
| 2002/0007402 A1* | 1/2002 | Huston et al. | 709/217 |
| 2002/0023270 A1* | 2/2002 | Thomas et al. | 725/95 |
| 2002/0078174 A1* | 6/2002 | Sim et al. | 709/219 |
| 2003/0056219 A1* | 3/2003 | Reichardt et al. | 725/60 |
| 2003/0066085 A1* | 4/2003 | Boyer et al. | 725/104 |
| 2003/0149988 A1* | 8/2003 | Ellis et al. | 725/87 |
| 2004/0107439 A1* | 6/2004 | Hassell et al. | 725/44 |
| 2004/0117831 A1* | 6/2004 | Ellis et al. | 725/53 |
| 2004/0165007 A1* | 8/2004 | Shafron | 345/781 |
| 2005/0028208 A1* | 2/2005 | Ellis et al. | 725/58 |
| 2005/0076378 A1* | 4/2005 | Omoigui | 725/87 |
| 2005/0204388 A1* | 9/2005 | Knudson et al. | 725/58 |
| 2005/0262542 A1* | 11/2005 | DeWeese et al. | 725/106 |
| 2005/0283800 A1* | 12/2005 | Ellis et al. | 725/40 |
| 2006/0095792 A1* | 5/2006 | Hurtado et al. | 713/189 |
| 2006/0190966 A1* | 8/2006 | McKissick et al. | 725/61 |

* cited by examiner

METHOD OF AND APPARATUS FOR DESCRIBING, PROMOTING, PUBLISHING, AGGREGATING, DISTRIBUTING AND ACCESSING LIVE CONTENT INFORMATION

RELATED APPLICATIONS

This application claims priority under 35 U.S.C. §119(e) of the co-pending U.S. provisional application Ser. No. 60/186,111 filed on Mar. 1, 2000 and entitled "THE LIVE CONTENT INFORMATION SYSTEM INCLUDING CONTENT DESCRIPTOR, CONTENT PUBLISHER, CONTENT AGGREGATOR, CONTENT DISTRIBUTOR, AND CONTENT ACCESS METHOD." The provisional application Ser. No. 60/186,111 filed on Mar. 1, 2000 and entitled "THE LIVE CONTENT INFORMATION SYSTEM INCLUDING CONTENT DESCRIPTOR, CONTENT PUBLISHER, CONTENT AGGREGATOR, CONTENT DISTRIBUTOR, AND CONTENT ACCESS METHOD" is also hereby incorporated by reference.

FIELD OF THE INVENTION

The present invention relates to the field of distributing and promoting content such as audio, video and text information. More particularly, the present invention relates to the field of distributing and promoting live content such as audio, video and text information, over the internet, television and radio.

BACKGROUND OF THE INVENTION

The World Wide Web (also known and hereinafter referred to as the "Internet") is a rapidly expanding network of computers which provide users with numerous services and a wealth of information. The internet is primarily a visually based system, allowing a user to graphically interact with an image or series of images on a display screen.

The internet was originally created as a non-commercial venue to provide communication links between government institutions as well as institutions of higher learning. Today, the internet has evolved to become a universal network of computers which include private industry as well as government institutions. The internet has become widely accessible to many people from computers located in many different places including homes and offices. Users are able to locate updated information regarding the weather, stock prices, news and many other topics. Further, users are able to locate a wide variety of information regarding products and services. Users are also able to buy products and services from retailer-oriented internet sites which are then shipped or provided to them after their order is placed. On auction-oriented internet sites users are able to bid against other users for products or services with the user making the highest bid within the specified time period receiving the particular product or service. Users are also able to communicate with other users over the internet through e-mail, bulletin boards, message lists and chat sites.

The internet offers many advantages over other media. The internet seamlessly links together and provides to users information stored on geographically distant servers. Similarly, the information on a server can be remotely updated from any geographic point from which access to the internet can be obtained.

When a user accesses information on a server over the internet, the user interfaces with the server through a website. Many websites offer hyperlinks to other websites, making the internet user friendly and allowing users to efficiently jump between websites and webpages. When accessing a website with a hyperlink to another website, by selecting the hyperlink, the user is enabled to link directly from the current website to the linked website without entering an address of the linked website. In use, a hyperlink is a visually discernible notation. The user activates or selects the hyperlink by "clicking" on the hyperlink notation or icon. This selection of the hyperlink is also referred to as a point and click operation. The user's computer is programmed to automatically access the website identified by the hyperlink as a result of the user's point and click operation.

When accessing an internet site, a user instructs a computer system, settop box or other internet access device to dial up the server of the user's internet service provider. The internet access device then controls the operation of a modem to establish the connection with the internet service provider over the public switched telephone network. Once a connection has been made between the modem and the internet service provider, the user must then log on to the service, usually by entering a username and a password. When the user is logged on to the service, the user can then access services and information provided by the service provider and also information available through web pages at other addresses on the internet. When accessing information available over the internet, the user connects through their service provider to other servers which are providing information. This information is usually provided at internet sites and web pages. Each internet site and web page has a particular address through which it can be accessed. By entering this address, the user is instructing their internet service provider to connect them to that address. As described above, the user also instructs their internet service provider to connect them to a specific address by selecting a hyperlink through a point and click operation.

Content available over the internet has been limited by the bandwidth and capabilities of the content provider's equipment, the internet service provider's equipment and the end user's equipment, as well as the bandwidth and capabilities of distribution systems through which the end user accesses the content from the internet service provider. As the bandwidth and capabilities of equipment and the available distribution systems have improved, the types and quality of content available over the internet has grown. Content providers now provide streaming media to end users which is a rich media including audio and video combined in a format which when viewed, allows the user to watch video clips of news, music performances, movies, etc.

Live content is content which changes as it is viewed, so that at any particular moment in time it is different than if viewed or heard prior to or after that moment. Part of the attraction of live content is that one does not know what will happen next, or one does know and is willing to wait and experience the live content. The live content is used to entertain and inform people and organized groups of people. Typical live content includes audio and video available on the internet, chat, cameras linked to the internet referred to as webcams, statistical feeds of information known as tickers, and live editorial or text.

There are several different ways and methods by which the live content is transmitted to the end user, which control how the end user is allowed to experience the content. A first method is a true live transmission method which means that the end user is experiencing the event on the internet at approximately the same time the content is being produced, or with a very short delay of seconds or minutes. This true live transmission method would be most common in live events that are occurring at approximately the same moment as the end user is experiencing that event, such as live music concerts or live sporting events. A second method is a pseudo live transmission method, which means that the content is produced in advance and it is presented on the internet at a scheduled time so as to create an impression of a live event. Most television programs fit into this pseudo live category. A third method is an on-demand transmission method which allows the end user to experience the live content at a time of their choice. This on-demand method can be used to access recorded or archived content that was originally true live content or pseudo live content. This on-demand method is quite common as a method to gain a larger audience for the live content, because the end user can experience the content at a time of their choice.

As the internet has grown, the demand for live content has increased and the supply or production of live content has grown as well. This has created an environment where the types of live content are diverse in their characteristics, yet the infrastructure is not in place to properly promote and distribute the content to end users. One of the problems associated with distributing live content arises because live content changes a lot at the last minute, as well as changes by definition while it is being experienced by an end user. This dynamic aspect of the live content has made basic communication and promotion of the live content difficult unless the live content is a major event that breaks through on a public relations level so that everyone knows when and where it occurs. Conventional search engines also do a poor job of tracking and providing information about live content. With most live content, the highest value is realized if the end users all experience the live content at the designated time. However, gaining an audience of an appropriate size at the designated time on the internet is difficult.

There are also difficulties associated with the actual production and distribution of live content. Live content is expensive to produce and distribute to the end user. Because the live content involves time-based elements it requires a combination of speed and precision to produce and distribute. There are also currently not industry accepted standards for generating revenue from the live content. Accordingly, each time for example, that a producer and sponsor agree on business terms for the production and distribution of live content, there are still many new issues that must be quickly worked out.

The experience of live content has been shown to have a high value to the end user. Because of this end users have a high degree of excitement about the live content and will generally buy more goods associated with the live content and have a more memorable experience. Yet, many end users still do not have access to the proper system or services to experience the live content as it was intended to be experienced.

The types of business relationships that occur relative to standard internet content, such as advertising and sponsorships are more difficult with live content. The initiation and maintenance of these types of relationships are difficult with live content because of the dynamic nature of the content, the speed at which a dialogue needs to occur and the ad-hoc nature of many of the business relationships that are entered into relative to live content, because the true live content is for a specific event or moment in time.

Since live content changes frequently, the addition of contextual information that describes or promotes the content, before, during and after the transmission of the live content is often necessary. New publishing tools from self-publishing for the amateur to high-end systems for professional webcasters and technologies have given rise to a wide variety of presentation methods for live content. Because few standard presentation methods currently exist to combine live content, there is typically a high degree of experimentation. Standards including XML, SMIL, RSS and ICE have emerged to help with the integration and distribution of content, yet most of these standards require a custom vocabulary associated with a particular application. No such standard currently exists which addresses the unique problems associated with the integration and distribution of live content.

SUMMARY OF THE INVENTION

A live content information system is used to register, promote and distribute true live content, pseudo-live content and on-demand content. The live content information system associates a registration number with the content. The live content is integrated into an overall presentation that includes auxiliary content. Snapshots or a portion of the content is integrated into a promotional viewer and distributed to advertise the content. The live primary content and auxiliary content are integrated and distributed within a live content viewer. The live primary content and auxiliary content are distributed from the appropriate sources to be displayed at the end user's computer system within the live content viewer. The live content information system also allows a producer of live content to be connected to one or more sponsors who will pay money for sponsoring the distribution of live content. The live content information system also allows live content to be quickly and easily interchanged between a producer of the live content and a partner such as a syndicator, distributor, affiliate and sponsor.

A method of registering a piece of content with a content information system comprises the steps of accessing the content information system, entering characteristics of the piece of content into the content information system and receiving a registration number from the content information system, wherein the registration number is permanently associated with the piece of content and refers to a location and the characteristics of the piece of content and further wherein the registration number is used to reference and locate the piece of content. The method further comprises the step of associating auxiliary content with the piece of content. The method further comprises the step of integrating the piece of content and the auxiliary content into an integrated presentation to be displayed to end users. The method further comprises the step of associating one or more sponsors with the piece of content. The sponsor is associated with the piece of content by registering the sponsor with the piece of content and associating sponsor's information with the piece of content and the auxiliary content into the integrated presentation. The sponsor's information includes one or more of graphics, logo and e-commerce offerings. The method further comprises the step of storing the piece of content, the auxiliary content and the associating sponsor's information within the integrated presentation. The method further comprises the step of generating promotional content to be used as promotional material of the piece of content. The method further comprises the step of recording portions of the piece of content to be used as promotional material of the piece of content. The method further comprises the step of associating promotional information with the portions of the piece of content. The method further comprises the step of integrating the portions of the piece of content and the promotional information into a promotional presentation to be displayed. The method further comprises the step of distributing the promotional presentation to be displayed as advertising for the piece of content. The portions of the piece of content are a selective one of snapshots from the piece of content, promotional pictures, promotional graphics, text information and entire piece of content. The method further comprises the step of distributing the piece of content, the auxiliary content and the associating sponsor's information within the integrated presentation from one or more sources to be displayed for end users. The method further comprises the step of distributing notification of availability of the integrated presentation. The notification is by one or more of e-mail, pager, telephone, alert and message alert to users of a website. The piece of content is one or more of audio, video, animation, interactive game, text, still photos, time-release photos, statistics and chat. The content information system is accessed over an internet connection. The content information system is also accessed over a wireless connection. The content information system is also accessed over a cable connection. The content information system is also accessed over a satellite connection.

A method of distributing content comprises the steps of accessing a content information system, entering characteristics of a piece of content into the content information system, receiving a registration number from the content information system, wherein the registration number is permanently associated with the piece of content and refers to a location and the characteristics of the piece of content and further wherein the registration number is used to reference and locate the piece of content, associating auxiliary content with the piece of content, integrating the piece of content and the auxiliary content into an integrated presentation and distributing the piece of content and the auxiliary content within the integrated presentation from one or more sources to be displayed for end users. The method further comprises the step of storing the piece of content and the auxiliary content within the integrated presentation. The method further comprises the step of generating promotional content to be used as promotional material of the piece of content. The method further comprises the step of recording portions of the piece of content to be used as promotional material of the piece of content. The method further comprises the step of associating promotional information with the portions of the piece of content. The method further comprises the step of integrating the portions of the piece of content and the promotional information into a promotional presentation to be displayed. The method further comprises the step of distributing the promotional presentation to be displayed as advertising for the piece of content. The portions of the piece of content are a selective one of snapshots from the piece of content, promotional pictures, promotional graphics, text information and entire piece of content. The method further comprising the step of associating one or more sponsors with the piece of content. The sponsor is associated with the piece of content by registering the sponsor with the piece of content and associating sponsor's information with the piece of content and the auxiliary content into the integrated presentation. The method further comprises the step of distributing notification of availability of the integrated presentation. The notification is by one or more of e-mail, pager, telephone, alert and message alert to users of a website. The piece of content is one or more of audio, video, animation, interactive game, text, still photos, time-release photos, statistics and chat. The content information system is accessed over an interne connection. The content information system is also accessed over a wireless connection.

A method of promoting content comprises the steps of accessing a content information system, entering characteristics of a piece of content into the content information system, recording portions of the piece of content to be used as promotional material of the piece of content, associating promotional material with the portions of the piece of content, integrating the portions of the piece of content and the promotional information into a promotional presentation to be displayed and distributing the promotional presentation to be displayed as advertising for the piece of content. The portions of the piece of content are a selective one of snapshots from the piece of content, promotional pictures, promotional graphics, text information and entire piece of content. The piece of content is one or more of audio, video, animation, interactive game, text, still photos, time-release photos, statistics and chat. The content information system is accessed over an internet connection. The content information system is accessed over a wireless connection. The method further comprises the step of receiving a registration number from the content information system, wherein the registration number is permanently associated with the piece of content and refers to a location and the characteristics of the piece of content and further wherein the registration number is used to reference and locate the piece of content. The method further comprises the step of generating promotional content to be used as promotional material of the piece of content.

A content information system for registering and distributing content comprises means for interfacing with the content information system and means for registering coupled to the means for interfacing for entering characteristics of a piece of content and generating a registration number to be permanently associated with the piece of content, wherein the registration number is used to track a location and the characteristics of the piece of content and further wherein the registration number is used to reference and locate the piece of content. The content information system further comprises a means for enhancing coupled to the means for registering for associating auxiliary content with the piece of content. The content information system further comprises a means for integrating coupled to the means for enhancing for integrating the piece of content and the auxiliary content into an integrated presentation. The content information system further comprises a means for storing coupled to the means for integrating for storing the piece of content and the auxiliary content within the integrated presentation. The piece of content and the auxiliary content within the integrated presentation are stored in relation to the registration number. The content information system further comprises a means for distributing coupled to the means for integrating for distributing the piece of content and the auxiliary content within the integrated presentation from one or more resources to be displayed for end users. The content information system further comprises a means for promoting coupled to the means for registering for generating promotional content to be used as promotional material of the piece of content. The content information system further comprises a means for promoting coupled to the means for registering for recording portions of the piece of content to be used as promotional material of the piece of content. The means for promoting further associates promotional material with the portions of the piece of content. The means for promoting also integrates the portions of the piece of content and the promotional information into a promotional presentation. The means for promoting further distributes the promotional presentation to be displayed as advertising for the piece of content. The portions of the piece of content are a selective one of snapshots from the piece of content, promotional pictures, promotional graphics, text information and entire piece of content. The means for distributing further distributes notification of availability of the integrated presentation. The notification is by one or more of e-mail, pager, telephone, alert and message alert to users of a website. The piece of content is one or more of audio, video, animation, interactive game, text, still photos, time-release photos, statistics and chat. The means for interfacing is accessed over an internet connection. The means for interfacing is also accessed over a wireless connection. The means for interfacing is also accessed over a cable connection. The means for interfacing is also accessed over a satellite connection.

A content information system for registering and distributing content comprises an interface circuit configured to allow access to the content information system and a registration module coupled to the interface circuit and configured to enter characteristics of a piece of content and generate a registration number to be permanently associated with the piece of content, wherein the registration number is used to track a location and the characteristics of the piece of content and further wherein the registration number is used to reference and locate the piece of content. The content information system further comprises an enhancement module coupled to the registration module to associate auxiliary content with the piece of content. The content information system further comprises an integration module coupled to the enhancement module to integrate the piece of content and the auxiliary content into an integrated presentation. The content information system further comprises a storage module coupled to the integration module to store the piece of content and the auxiliary content within the integrated presentation. The piece of content and the auxiliary content within the integrated presentation are stored in relation to the registration number. The content information system further comprises a distribution module coupled to the integration module to distribute the piece of content and the auxiliary content within the integrated presentation from one or more sources to be displayed for end users. The registration module records portions of the piece of content to be used as promotional material of the piece of content. The registration module further associates promotional material with the portions of the piece of content. The registration module also integrates the portions of the piece of content and the promotional information into a promotional presentation. The registration module further distributes the promotional presentation to be displayed as advertising for the piece of content. The portions of the piece of content are a selective one of snapshots from the piece of content, promotional pictures, promotional graphics, text information and entire piece of content. The distribution module further distributes notification of availability of the integrated presentation. The notification is by one or more of e-mail, pager, telephone, alert and message alert to users of a website. The piece of content is one or more of audio, video, animation, interactive game, text, still photos, time-release photos, statistics and chat. The interface circuit is accessed over an internet connection. The content information system is accessed over a wireless connection.

A network of devices for registering and distributing content comprises a content information system including an interface circuit configured to allow access to the content information system and a registration module coupled to the interface circuit and configured to enter characteristics of a piece of content and generate a registration number to be permanently associated with the piece of content, wherein the registration number is used to track a location and the characteristics of the piece of content and further wherein the registration number is used to reference and locate the piece of content, one or more involved entity computer systems through which persons involved in the registration of the piece of content access the registration module and one or more end user computer systems through which end users access the piece of content. The content information system further comprises an enhancement module coupled to the registration module to associate auxiliary content with the piece of content. The content information system further comprises an integration module coupled to the enhancement module to integrate the piece of content and the auxiliary content into an integrated presentation. The content information system further comprises a storage module coupled to the integration module to store the piece of content and the auxiliary content within the integrated presentation. The piece of content and the auxiliary content within the integrated presentation are stored in relation to the registration number. The content information system further comprises a distribution module coupled to the integration module to distribute the piece of content and the auxiliary content within the integrated presentation from one or more sources to be displayed for end users. The registration module records portions of the piece of content to be used as promotional material of the piece of content. The registration module further associates promotional material with the portions of the piece of content. The registration module also integrates the portions of the piece of content and the promotional information into a promotional presentation. The registration module further distributes the promotional presentation to be displayed as advertising for the piece of content. The portions of the piece of content are a selective one of snapshots from the piece of content, promotional pictures, promotional graphics, text information and entire piece of content. The distribution module further distributes notification of availability of the integrated presentation. The notification is by one or more of e-mail, pager, telephone, alert and message alert to users of a website. The piece of content is one or more of audio, video, animation, interactive game, text, still photos, time-release photos, statistics and chat. The interface circuit is accessed over an internet connection. The content information system is accessed over a wireless connection.

A promotional viewer for viewing promotional material associated with available content comprises a snapshot window which includes portions of a piece of content, a promotional window which includes promotional information to be associated with the portions of the piece of content and an access window which includes access information regarding how to access the piece of content. The promotional viewer is distributed to be displayed as advertising for the piece of content. The portions of the piece of content are a selective one of snapshots from the piece of content, promotional pictures, promotional graphics, text information and entire piece of content. The access window includes a link to the piece of content.

A content viewer for viewing a piece of content and associated auxiliary content comprises a primary content window within which the piece of content is displayed and one or more associated auxiliary content windows within which the auxiliary content associated with the piece of content is displayed. The associated auxiliary content windows include an interactive window within which interactive information is displayed. The associated auxiliary content windows include a chat window within which chat information is displayed. The associated auxiliary content windows include an advertising window within which advertising information is displayed. The associated auxiliary content windows include a contextual message window within which information relating to the piece of content is displayed. The associated auxiliary content windows include a sponsor's window within which sponsor information is displayed.

DETAILED DESCRIPTION OF THE PREFERRED EMBODIMENT

Figure 1:
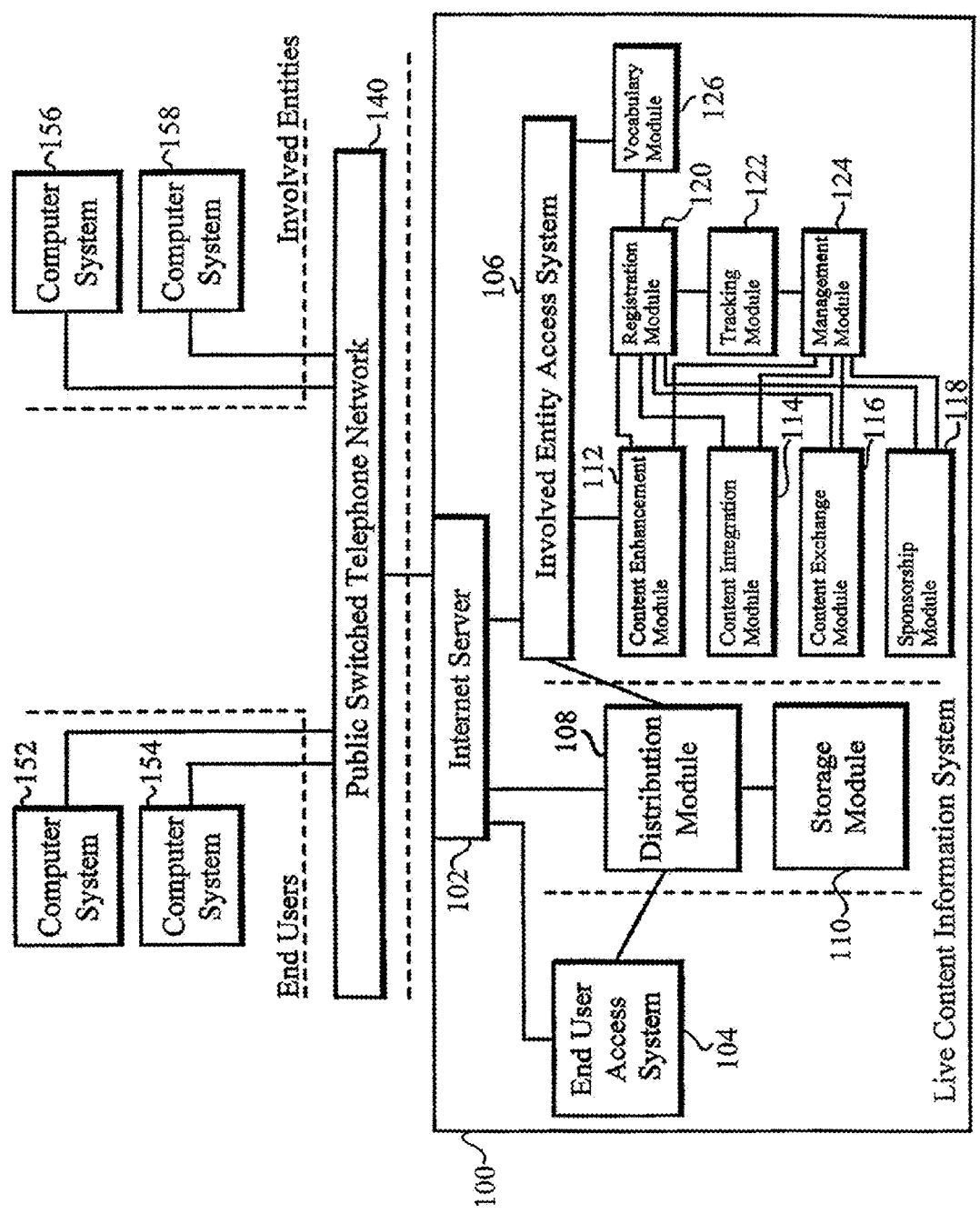
FIG. 1 illustrates a block diagram of a live content information system according to the preferred embodiment of the present invention.

The live content information system of the present invention is a method for describing, combining, enhancing, monetizing, promoting and distributing live content on the internet. The live content information system involves an end-to-end process for generating and distributing live content encompassing the entire value chain of live content, including producers, distributors, sponsors, syndicators, affiliates and end users. The use of the live content information system in this process has benefits for each of the groups within the live content value chain. This system is an information system which provides benefits to companies associated with the live content. As an information system it runs independent of the actual transmission or streaming of the live content, yet the live content information system links to and tracks the live content transmission process. The live content information system is used to give live content an independent identity regardless of the source of the content, the website or websites on which it is located and where it is distributed from. The live content information system can also integrate with and control the live content transmission process. Preferably, the live content information system is internet based. However, the origin or destination of the live content does not have to be on the internet, but could be also radio and television. Further, the user can access the content from any appropriately configured reception device which includes at least a computer system, settop box, internet access device, wireless device, handheld device, telephone, television and radio.

The live content information system of the present invention is used for describing, promoting, publishing, aggregating, distributing and accessing live content information. The live content information allows for an easy way to describe live content, and utilize that description for the promotion and distribution of that content. This includes taking snapshots of the live content for promotional purposes. The live content information system also reduces errors in items such as correctly identifying the time and location for access of the live content, the technology required to view the live content and being able to make changes at the last-minute without risking a loss in end user accesses of the live content. The live content information system allows elements to be added to the content that increase the usability and marketability of the content. This allows the live content to be described in a way that can be useful in the promotion and distribution of the live content. This description can be stored and distributed to provide a means for creating a network of live content using the live content information system by organizing the information in the live content information system and presenting it in a useful form, such as a guide.

The live content information system also allows live content to be quickly and easily interchanged between the producer of the live content and a partner such as a syndicator, distributor, affiliate and sponsor. This method of interchange is preferably a virtual method which accommodates speed and precision and takes advantage of the internet's ability to link one party to the next for the transfer of information. The live content information system also allows a producer of live content to be connected to one or more sponsors who will pay money for sponsoring the distribution of the live content. This connection includes providing a means of matching the sponsor and the producer, integrating the producer's content and the sponsor's information such as graphics, logo and e-commerce offerings for distribution and distributing the sponsored content to end users over the internet. If multiple sponsors are affiliated with the distribution of the live content, the distribution and presentation of the live content can be different for each sponsor.

The live content information system can also be used to easily integrate a single live content source into an overall presentation that includes other live content and non-live content which adds information and value to the live content. The auxiliary content integrated into the overall presentation enhances the primary content and the end user's experience. The auxiliary content may be synchronized elements such as text transcriptions of a speech that is being heard, or commerce offerings timed to coincide with a particular moment in time that an end user of the content is most likely to buy a product. The live content and the overall presentation or selective portions of the overall presentation can also be exchanged between the internet and non-internet sources such as television and radio. The live content information system of the present invention preferably provides a method of quickly promoting the content and drawing an audience of end users for the live content.

The live content information system involves all the organizations within the live content value chain, from creation through distribution of the live content. In this process different types of organizations are involved at each level including the producer, the distributor, syndicator, affiliates, sponsor and end user. The producer includes the person or organization who generated the live content, as well as the owner of the content. The producer and content owner can be the same person or organization or in some circumstances they will be separate entities. Preferably, within the live content information system of the present invention, the producer controls the content and has the rights, including legal rights, to distribute the content.

The distributor is the organization or entity which distributes the live content to the end user. The distributor is generally the website or the entity owning or controlling the website that the end user clicked on to launch the live content.

The syndicator is an organization or entity that generates multiple distribution points for live content, either manually or through a series of automated steps. Syndicators find and develop business relationships with distributors.

An affiliate is a distributor who has an arrangement with the producer that allows for a linkage of the live content in some form. An affiliate is similar to a distributor, but an affiliate may have an informal cross-promotional partnership with the producer. This cross-promotional partnership is different from a formal commercial relationship which generally exists between a distributor and a producer.

A sponsor generally receives an integrated group of benefits from the live content producer in return for paying money to sponsor the live content. These benefits include inclusion within the live content itself, graphics integrated around the live content, linkage to the live content on the sponsor's website and the opportunity to sell goods or services.

The end user is an individual who experiences the final live content in any one or more forms including audio, video and chat. For audio, the end user is the person who listens to the live content. For video, the end user is the person who listens and watches the live content. For chat, the end user is the person who participates in the chat. An end user can experience the live content in all these forms simultaneously, or individually.

A block diagram of a live content information system according to the preferred embodiment of the present invention is illustrated in FIG. 1. A live content information system 100 includes an internet server 102, an end user access system 104, an involved entity access system 106, a distribution module 108 and a storage module 110. The distribution module 108 and storage module 110 are used to store and distribute live content and integrated portions of live content streams through the internet server 102. The distribution module 108 is used to control and track the distribution of live content streams. Involved entities can also register with the distribution module 108 to specify that if content of a specified type is available, the involved entity automatically wants to syndicate, distribute or sponsor the content, as appropriate. For example, a news site can register with the live content information system to automatically receive any news-related content specific to a certain geographic area. Then, when a producer registers content that matches this criteria, the distribution module 108 will automatically send the matching content to the news site for further distribution.

The end user access system 104 is coupled to the internet server 102 to control communications between the live content information system 100 and end users accessing content and related information through the live content information system 100. The involved entity access system 106 is coupled to the internet server 102 to control communications between the live content information system 100 and involved entities accessing the live content information system 100. Involved entities preferably include entities other than end users which are involved in the generation or distribution of the content including producers, distributors, syndicators, affiliates and sponsors.

The live content information system 100 also includes a vocabulary module 126, a registration module 120, a tracking module 122, a management module 124, a content enhancement module 112, a content integration module 114, a content exchange module 116 and a sponsorship module 118, all coupled to the involved entity access system 106. The vocabulary module 126 manages a vocabulary for describing and communicating the characteristics of live content, therefore allowing a common method of communication among all of the parties accessing the live content information system 100. The vocabulary includes terms for describing the type of content, technical characteristics of the content, the start and stop time of the content, the methods of accessing the content and the location of the content. The type of content includes at least video, audio, animation, interactive game, still photos, periodic sequence or time-release of still photos, chat, webcam, text, statistics and integrated, meaning a combination of types of content. The technical characteristics of the content include the technology needed to integrate, distribute and view the content and other characteristics such as the frame rate for any video within the content. The start and stop time of the content includes terms regarding when the live content is available and when it will end. The methods of accessing the live content specify that the content is true live and available only at a specific time, pseudo live and available only at scheduled times and on-demand and available at the demand of an end user. The location of live content specifies where the content is to be distributed from including an internet locator value, a specified URL or a computer filename. This location can be from the live content information system 100 itself or any other appropriate location, including a website, URL or file of any entity, including involved entities. The location of the live content can include a file within a personal computer system accessed by a peer-to-peer type network.

The registration module 120 controls the registration of live content and the input of certain characteristics corresponding to live content. Through the registration module 120, a producer registers their live content and inputs the characteristics corresponding to their live content. Once a producer registers their live content with the registration module 120, the registration module 120 will then issue a registration number corresponding to the live content to the producer. This registration number will then be permanently associated with the live content and can be used to refer or locate the live content for promotion and distribution of the live content. Each separate piece of live content will preferably have its own corresponding registration number. For example, preferably, the actual live content itself, an associated promotional viewer and an associated live content viewer will each have a separate corresponding registration number. The registration module 120 manages the ownership of the content, including the name and organization of the ownership entity associated with the content. The registration module 120 also manages and restricts the levels of access to change content and/or information associated with the content. The registration module 120 manages possible additions to the content, such as enhanced content, items or information to be integrated with the content, including sponsorship information and graphics. Further, the registration module 120 manages promotional snapshots associated with the available content including links from websites, still images taken from the content stream and text information, as will be discussed below.

The tracking module 122 tracks the live content that has been registered by the registration module 120. Preferably, the registration number is embedded in the content to aid in this tracking process. Utilizing the tracking module 122 and the registration number associated with the content, if the location of the content or other basic information like the start time of the display of the live content is changed, then that information can be logged and communicated to other interested parties through the tracking module 122. The tracking module 122 preferably regularly checks for changes in the status of registered content and communicates any changes to the content or information associated with the content to the producer and other interested parties or involved entities. Utilizing the registration number associated with the content, the tracking module 122 also automatically transfers distributors and syndicators to the correct live content regardless if the location or characteristics of the registered live content has changed.

The content enhancement module 112 allows for additional information to be associated with the live content. This additional information may help to give context to the live content, to market the live content and to increase usage of the live content. Utilizing the content enhancement module 112, a producer designs a basic template for addition and inclusion of additional information with the live content. This template or live content viewer provides windows around the live content that other auxiliary content, including live content, can be added to the live content. Also, through this template or live content viewer, graphic presentations surrounding the live content can also be integrated with the distribution of the live content. The content enhancement module 112 also allows a notification feature to be associated with the content, which allows end users to notify others of the availability of the live content. This notification can be by any appropriate means, including e-mail, pager, telephone message, alert or a message alert to users logged into a website or internet service provider. If the notification is by e-mail, these others receiving the e-mail notification can then opt in through a link provided within the e-mail notification to then begin receiving the live content. Also, utilizing the content enhancement module 112, polls, surveys and other interactive activities can be added to the distribution of the live content.

The content integration module 114 allows for the integration of different content types from different producers. For example, a video from one producer and a titling and text enhancement from another producer can be integrated together by the content integration module 114 to give context to the live content as it is viewed by the end user. The content integration module 114 controls this integration from multiple producers. Utilizing the content integration module 114, the multiple producers agree on what is allowed to be added to the content and by whom. Through this process, the basic framework for adding the content is established.

The content exchange module 116 allows all parties and involved entities involved with the live content, including producers, distributors and sponsors, to access and utilize the live content. The content owner defines rules for access and distribution of the content by the other involved entities. This access and utilization available through the content exchange module 116 includes everything from generating full-sponsored and delivered live content from the producer to the sponsor, to generating special links and snapshots associated with the content for promotional use only.

The sponsorship module 118 allows for sponsors who are interested in being associated with live content to complete that process. The sponsorship module 118 also allows producers of the content to describe and advertise the possible sponsorship scenarios available for specific live content, including defining the categories of sponsorship available for the live content. The sponsorship module 118 controls the registration of sponsors as well as determining and specifying sponsorship parameters associated with live content. The sponsorship module 118 also provides information to sponsors about live content and matches sponsors with producers of the live content. The sponsorship module 118 tracks the usage of the live content from sponsors and provides any additional information to sponsors about the live content. As described above, multiple sponsors can separately or in combination, sponsor the distribution of the same live content. If multiple sponsors are affiliated with the distribution of the live content, the distribution and presentation of the live content can be different for each sponsor.

The management module 124 allows all of the involved entities utilizing the live content information system 100 to receive information about their participation in the live content information system 100. This information includes reports, statistics and administrative information regarding the entity and their participation in the distribution of live content utilizing the live content information system 100. Utilizing the management module 124, the involved entity can receive reports, statistics and administrative information about the different streams of live content that the entity has been involved with, as well as other associated statistical information such as the amount of usage or number of end users who accessed the live content.

The live content information system 100 is coupled to the public switched telephone network 140 to allow communications between both the internet server 102 and the end users' computer systems 152 and 154 and the involved entities' computer systems 156 and 158. Using the computer systems 156 and 158, the involved entities establish a connection with the involved entity access system 106 to register live content and control relationships and integration of other content associated with the live content. Preferably, this connection is established between the involved entities' computer systems 156 and 158 over the internet through the public switched telephone network 140. Alternatively, this connection is established by any appropriate connection including a direct connection over the public switched telephone network 140, or from a device other than a computer system, such as a settop box, internet access device, wireless device, handheld device, telephone, television or radio. Using the computer systems 152 and 154, end users can access live content that is distributed from the distribution module 108, from the computer systems 156 and 158 of the involved entities or from other computer systems coupled to the public switched telephone network 140. Preferably, this connection is established between the end users' computer systems 152 and 154 and the internet server 102 or the involved entities' computer systems 156 and 158, as appropriate, over the internet through the public switched telephone network 140. Alternatively, this connection is established by any appropriate connection including a direct connection over the public switched telephone network 140, or from a device other than a computer system, such as a settop box, internet access device, wireless device, handheld device, telephone, television or radio.

Figure 2:
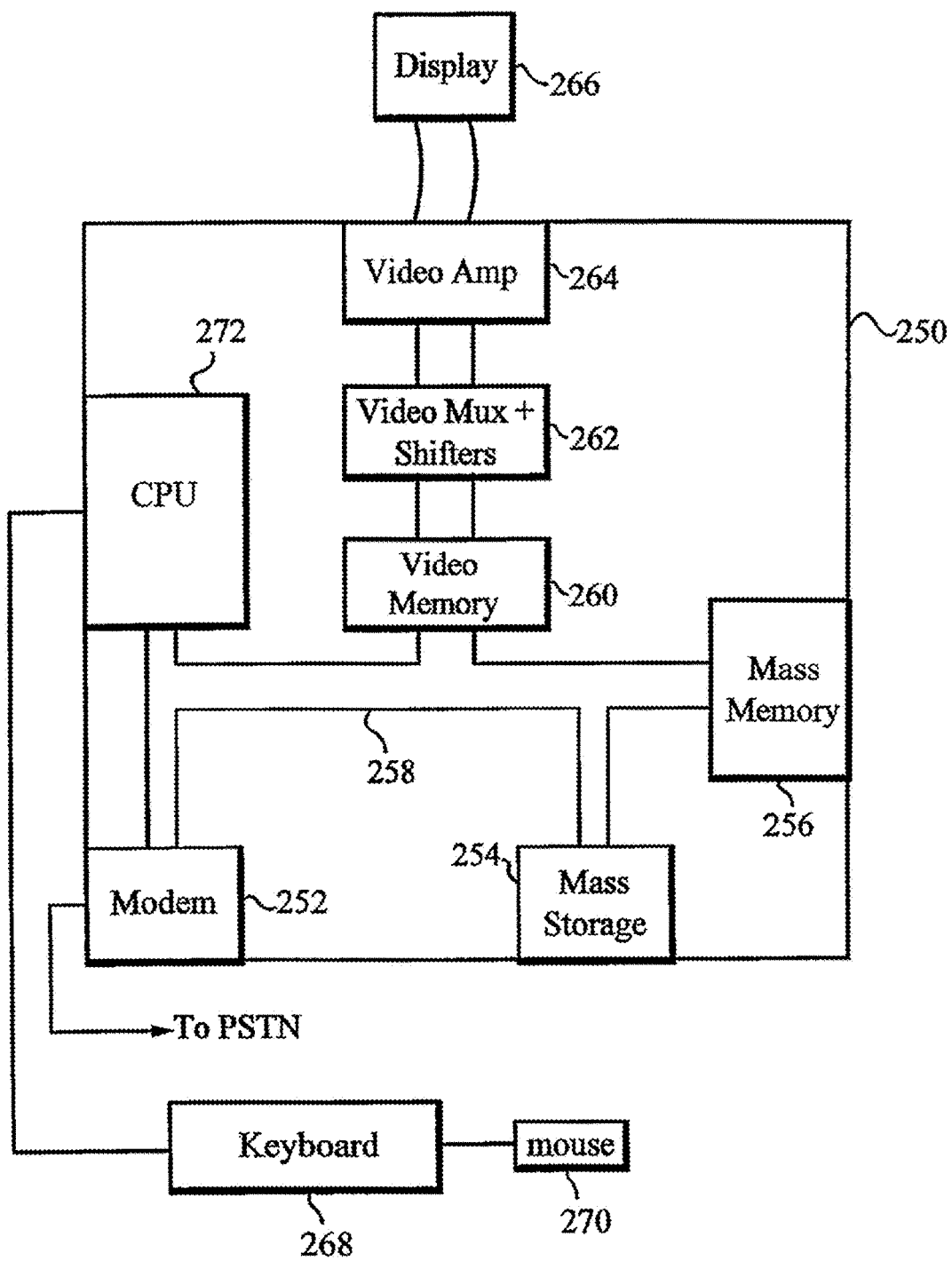
FIG. 2 illustrates a block diagram of an exemplary computer system used to access the live content information system of the present invention.

A block diagram of the internal components of the computer systems 152-158 used by end users and involved entities to access the live content information system 100 of the present invention is illustrated in FIG. 2. While the live content information system 100 can be accessed from any appropriately configured computer system or internet access device, an exemplary computer system 250 for accessing the live content information system 100 is illustrated in FIG. 2. The exemplary computer system 250 includes a CPU 272, a main memory 256, a video memory 260, a mass storage device 254 and a modem 252, all coupled together by a conventional bi-directional system bus 258. The modem 252 is preferably coupled to the public switched telephone network 140 for sending and receiving communications. The mass storage device 254 may include both fixed and removable media using any one or more of magnetic, optical or magneto-optical storage technology or any other available mass storage technology. The system bus 258 contains an address bus for addressing any portion of the memory 254, 256 and 260. The system bus 258 also includes a data bus for transferring data between and among the CPU 272, the main memory 256, the video memory 260, the mass storage device 254 and the modem 252.

The computer system 250 is also coupled to a number of peripheral input and output devices including the keyboard 268, the mouse 270 and the associated display 266. The keyboard 268 is coupled to the CPU 272 for allowing a user to input data and control commands into the computer system 250. A conventional mouse 270 is coupled to the keyboard 268 or computer system 250 directly, for manipulating graphic images on the display 266 as a cursor control device in a conventional manner. The display 266 displays video and graphical images generated by the computer system 250.

A port of the video memory 260 is coupled to a video multiplex and shifter circuit 262, which in turn is coupled to a video amplifier 264. The video amplifier 264 drives the display 266, when it is being used. The video multiplex and shifter circuitry 262 and the video amplifier 264 convert pixel data stored in the video memory 260 to raster signals suitable for use by the display 266.

End users will view portions of the content in promotional information within a promotional viewer while accessing or viewing other information at other web sites. Alternatively, end users can receive the promotional viewer downloaded to their computer for viewing. End users will also view the entire content including the primary content and associated auxiliary content through a live content viewer when they select and access the live content.

Figure 3:
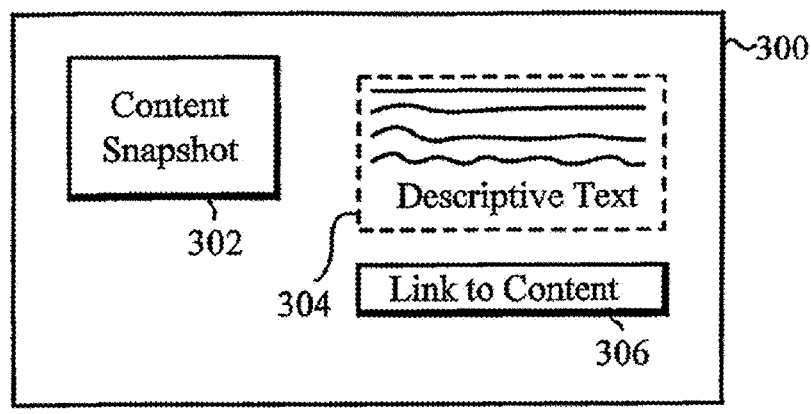
FIG. 3 illustrates the preferred embodiment of a promotional viewer.

The preferred embodiment of the promotional viewer 300 is illustrated in FIG. 3. The promotional viewer 300 includes a content snapshot window 302 in which a visual representation of the content is displayed. This visual representation displayed within the content snapshot window 302 can be still pictures taken from the content, a promotional picture representative of the content, text information included in or relative to the content or the actual content itself. The promotional viewer 300 also includes a descriptive text window 304 in which descriptive and promotional information about the content is displayed. In this descriptive text window 304, information about the content is displayed, as well as scheduling, location and other information associated with the content. The promotional viewer 300 also preferably includes a link to the content 306, which if selected by the end user, will allow the end user to access the content that is being advertised within the promotional viewer 300.

Preferably, the promotional viewer 300 has its own separate content registration number and is distributed by the live content information system 100 to be shown on websites and television programming affiliated with the live content information system 100 in order to promote and advertise the live content represented within the promotional viewer 300. When included on websites, the promotional viewer 300 is included where the websites typically include other advertising material, such as banner advertisements, logo placements and advertising graphics. In this manner, the promotional viewer 300 is shown to the end user while the end user is viewing and accessing other information at the website. When the end user selects the link to the content 306 within the promotional viewer 300, the user's browser is directed to the source of the content and the end user is then able to view the content that was represented within the promotional viewer. Through the promotional viewer, there can also be an option to send a notification, such as e-mail, pager or telephone message, to a prospective end user notifying them of the availability of the content. Involved entities also preferably have the capability to distribute this notification.

The live content information system 100 includes promotional material within the promotional viewer 300. This promotional material is a partial amount of the content, which can be anything from a very small amount of the actual live content to the full live content. The live content information system 100 will preferably generate this promotional material automatically from the live content and include it within the content snapshot window 302 alongside the descriptive information within the descriptive text window 304. The snapshot included within the content snapshot window 302 can include any visual media such as video, a feed from a webcam, still photos or text information. The snapshot can be a pre-determined frame rate or subset of the actual complete images from the live content. For example, the snapshot might be one visual frame every minute for a video that has 30 frames per second. Alternatively, the producer or other involved entity may select certain specific live images to include within the content snapshot window 302 in the promotional viewer 300. For content that is text or copy, the content snapshot window 302 can include anything from full scrolling text to only pre-selected pieces or parts of the text. For audio content, the promotional viewer 300 can include the full audio content or selected parts or portions of the audio content.

Figure 4:
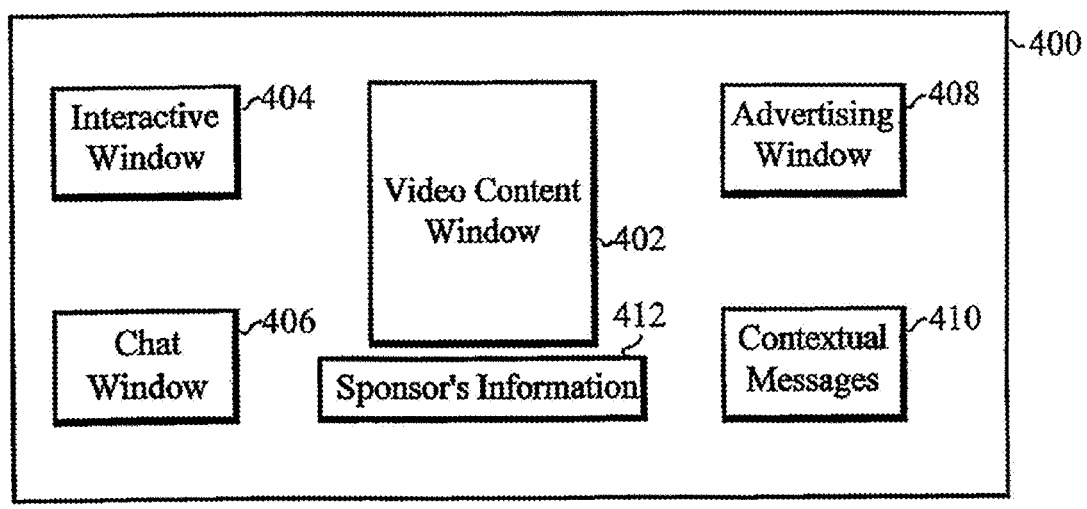
FIG. 4 illustrates the preferred embodiment of a live content viewer.

When an end user accesses the live content, the end user preferably views the live content through a live content viewer 400, as illustrated in FIG. 4. The live content viewer 400 includes a video content window 402 through which the video feed associated with the primary live content is displayed. The live content viewer 400 also preferably includes other windows through which integrated auxiliary content and information relative to the primary content within the video content window 402 is displayed. It should also be understood that when a user views content within the video content window 402 there is also preferably an audio feed that is presented to the end user. The audio feed includes audio information which corresponds to the information being displayed within the video content window 402.

The auxiliary windows within the exemplary live content viewer 400 include an interactive window 404, a chat window 406, an advertising window 408, a contextual message window 410 and a sponsor's information window 412. Within the interactive window 404, interactive information such as votes, survey questions and trivia questions is displayed for the end user. This information is interactive because the user has the ability to respond to this information as it is displayed. The user responds to the information currently being displayed within the interactive window 404 by selecting the interactive window 404 and entering responsive information as appropriate.

Within the chat window 406, a scrolling chat feed is displayed which corresponds to the information being displayed within the video content window 402. The end user can participate in this chat conversation or can simply view the conversation that others are having as it is displayed within the chat window 406.

Within the advertising window 408, advertising and promotional material is displayed for the end user. This advertising and promotional material displayed within the advertising window 408 can be any appropriate type of advertising and promotional material including information directly relevant to the information being displayed within the video content window 402, information targeted towards the typical audience of the information being displayed within the video content window 402 or other information. If an end user is interested in ordering an item or service or accessing advertised material displayed within the advertising window 408, the end user can select the advertising window and will be instructed as to how to order the advertised goods or access the advertised material.

Within the contextual messages window 410, a producer or other appropriate involved entity can display contextual information to the end user. Preferably, the contextual information is relative to the information being display within the video content window 402 or other windows 404, 406 and 408 and is utilized to enhance the end user's experience when accessing the live content within the live content viewer 400. It should be apparent to those skilled in the art that the live content viewer 400 can include other appropriate windows for displaying appropriate information.

Within the sponsor's information window 412, information from or about the sponsor of the live content is displayed. This sponsor information can include advertisements from the sponsor, the sponsor's logo, e-commerce offerings from the sponsor or related entities or any other information to be displayed by the sponsor.

It should be apparent to those skilled in the art that the live content viewer 400 can include other arrangements or combinations of auxiliary content than that shown in FIG. 4.

The live content information system 100 of the present invention is used to add other relevant descriptive and contextual auxiliary information relative to the live or primary content. This other auxiliary information is added and displayed with the live content within the live content viewer 400, as described above. There is also other control and internal information associated with the content and maintained by the live content information system 100 that is used to store, distribute and promote the live content. This other information includes the type of content included such as whether the content includes audio, video, or both, animation, still photos, time-release photos, feed from a webcam, text, chat or a combination of these types of content. The other information also includes the technical characteristics of the content and information about the source of the content, such as whether the content is to be distributed through the distribution module 108 of the live content information system 100 or from the producer's server. The other information also includes time characteristics associated with the content, such as when the content is going to start and what is going to occur within the content stream at what time.

The live content information system 100 is utilized to combine and assemble the live content with various descriptive auxiliary information and other auxiliary information into one cohesive presentation for the end user. This combination of the live content and other associated auxiliary information is presented to the end user through the live content viewer 400. The live content information system 100 then delivers this information to a medium that can handle the assembled audio/visual content included within the live content viewer 400. All of the information included within the live content viewer 400 does not all necessarily come from the live content information system 100 or even a single source. These pieces of information to be included within the live content viewer 400, including the primary content and the auxiliary content, can originate and be distributed from many different sources. The live content information system 100 then controls the distribution of the pieces of information to the end user and the assembly of these pieces into the live content viewer 400 so that they can be cohesively and appropriately displayed to the end user, regardless of the source of the information. Preferably, each of these pieces has an associated content registration number that is used to track and control this distribution. The live content viewer 400 and the included information can be displayed and accessed at any appropriate location and by an appropriate devices, including on web sites on the internet, on a wireless device, on a handheld device, on a telephone, displayed on television programming and provided through radio programming. The live content viewer 400 and the included information can be available at multiple locations and simultaneously viewed by many end users through syndication or other distribution methods.

Figure 5:
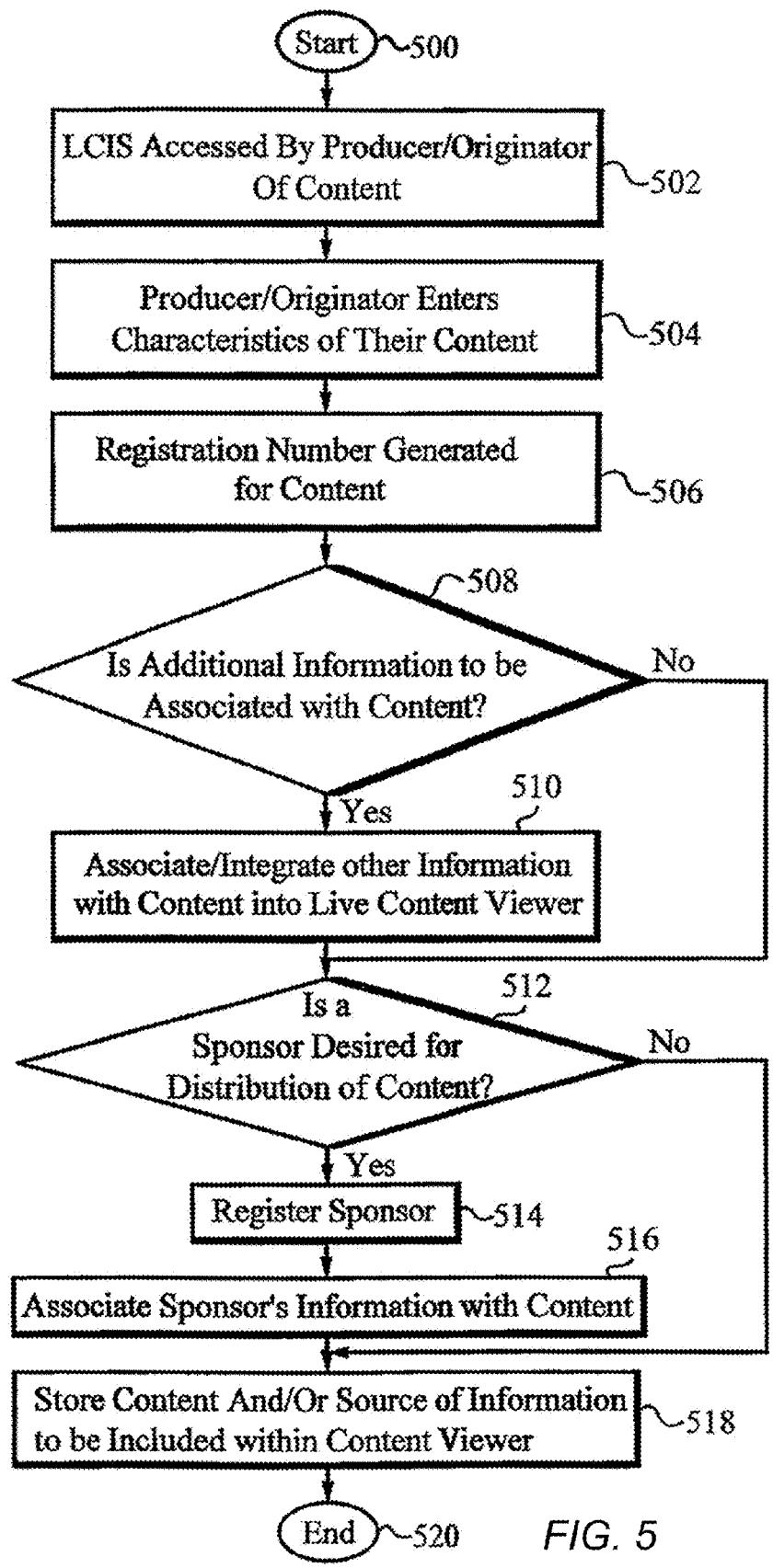
FIG. 5 illustrates a flowchart of the process used to register live content and associate other auxiliary information with the live content information system of the present invention.

A flowchart illustrating the process used to register live content with the live content information system 100 of the present invention and associate other auxiliary information and content with live content is illustrated in FIG. 5. The process of FIG. 5 starts at the step 500. At the step 502, the live content information system 100 is accessed by a producer or originator of the content in order to register the content with the live content information system 100. At the step 504, the producer or originator of the live content enters characteristics of the live content including the type of content, the technical characteristics associated with the content, the start and stop time of the content, the methods of accessing the content and the location of the live content. At the step 506, the live content information system 100 then generates a registration number to always be associated with this particular live content.

At the step 508, it is then determined if additional auxiliary information is to be associated with the live content to be included within the live content viewer 400. If it is determined at the step 508, that additional information is to be associated or integrated with the live content, then at the step 510, the additional information is associated or integrated with the live content into the appropriate window or windows of the live content viewer 400. Otherwise, if it is determined at the step 508 that additional information is not to be associated or integrated with the live content, or after the completion of the step 510, then it is determined at the step 512, if a sponsor is desired for distribution of the content. If it is determined at the step 512 that a sponsor is desired for distribution of the content, then the sponsor is selected, registered and associated with the content, at the step 514. At the step 516, the sponsor's information, advertising and/or graphics are then associated with the content to be displayed within the sponsor's information window 412 of the live content viewer 400. Otherwise, if it is determined at the step 512, that a sponsor is not desired for distribution of the content at the step 512, or after the completion of the step 516, then the content and/or the source of information to be included within the live content viewer 400 is stored corresponding to the registration number associated with the content at the step 518. The registration process of FIG. 5 then ends at the step 520.

Figure 6:
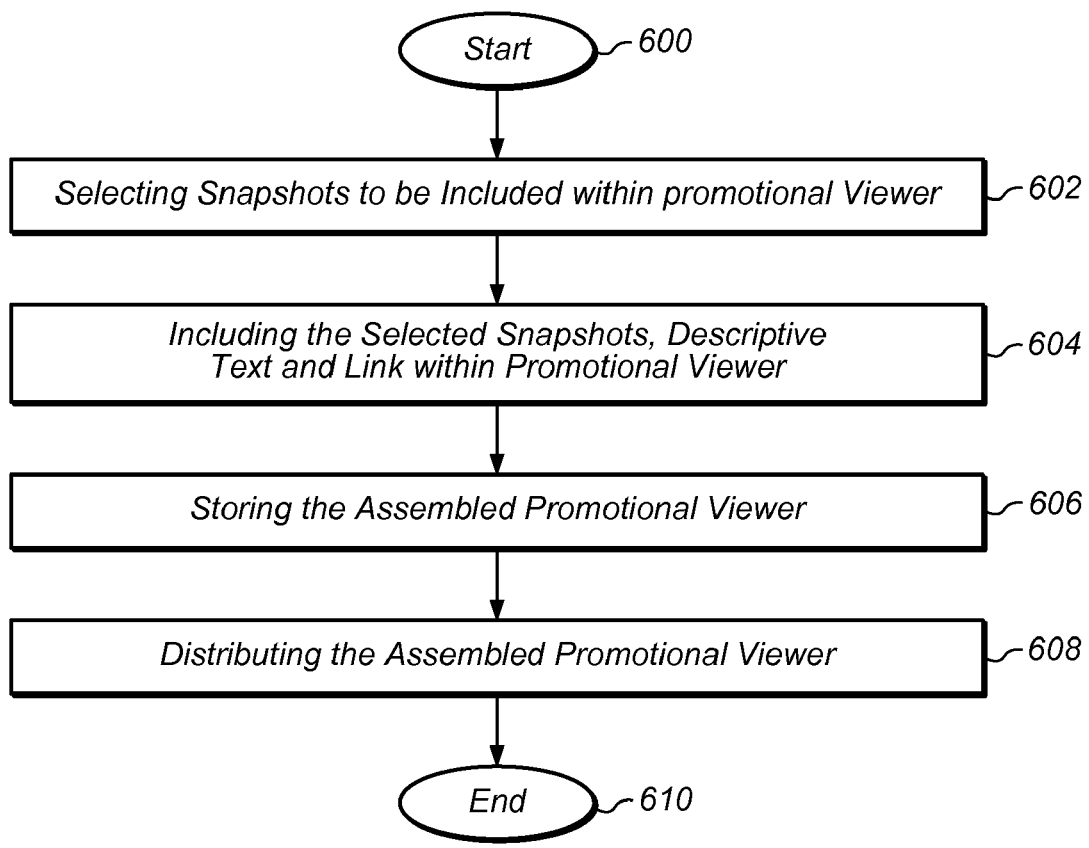
FIG. 6 illustrates a flowchart of the process used to promote live content registered with the live content information system of the present invention.

A flowchart illustrating the process used to promote live content registered with the live content information system 100 of the present invention is illustrated in FIG. 6. The process of FIG. 6 starts at the step 600. At the step 602, snapshots corresponding to the content are selected. These snapshots are selected for inclusion and display within the content snapshot window 302 of the promotional viewer 300. At the step 604, the selected snapshots, corresponding descriptive text and link to the content are included within the appropriate window of the promotional viewer 300. The assembled promotional viewer and associated information is then stored at the step 606. The assembled promotional viewer and associated information is then distributed to appropriate internet sites, television programmers and other sites where the promotional viewer is to be displayed, at the step 608. The promotional process of FIG. 6 then ends at the step 610.

Figure 7:
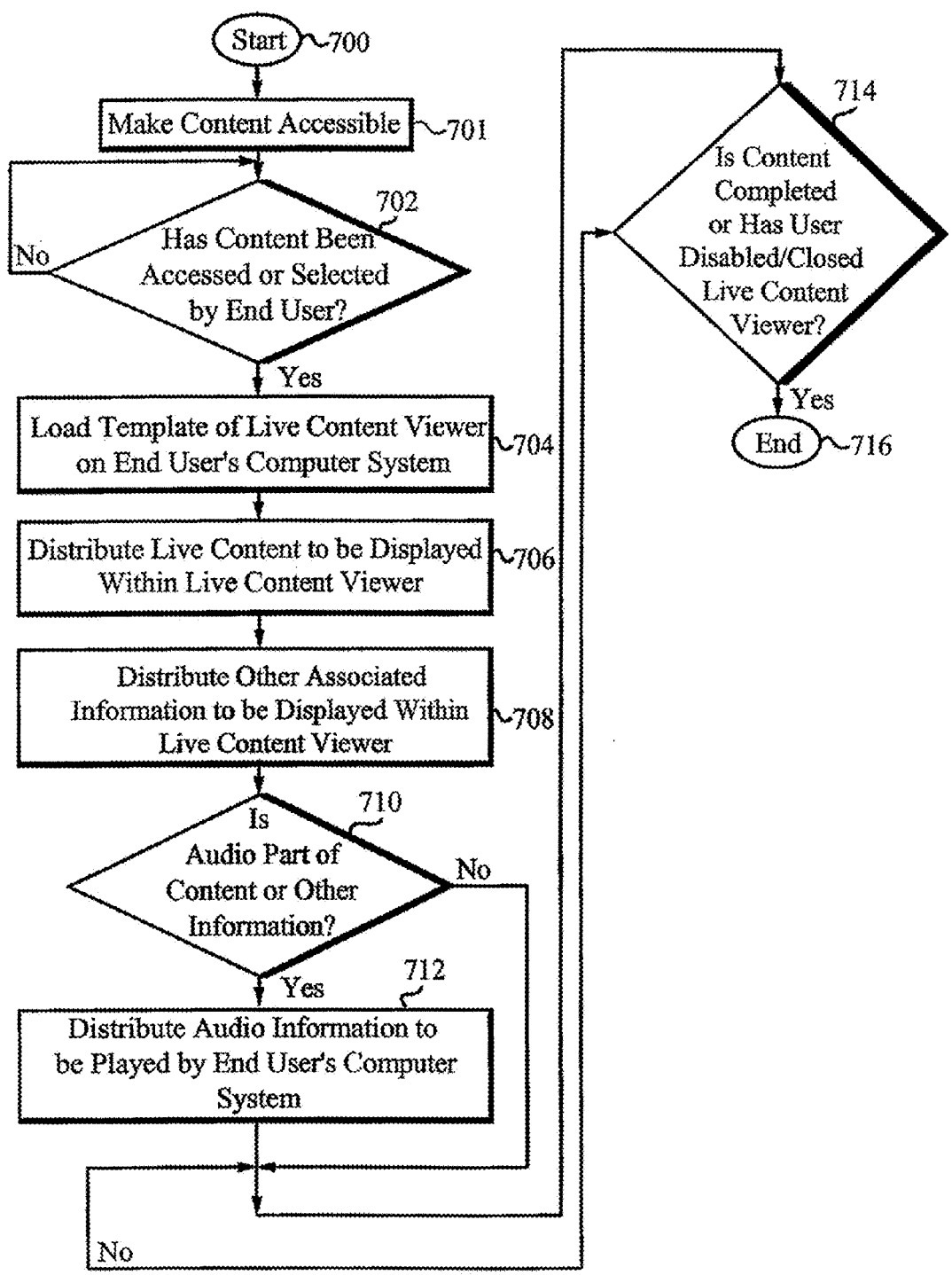
FIG. 7 illustrates a flowchart of the process used to distribute live content registered with the live content information system of the present invention.

A flowchart illustrating the process used to distribute live content registered with the live content information system 100 of the present invention is illustrated in FIG. 7. The process of FIG. 7 starts at the step 700. At the step 701, the content is made accessible to end users. This includes displaying an access window, link or advertisement to the end users through which the end users can then access and select to receive the live content. At the step 702, it is determined if an end user has accessed or selected the content. Once it is determined at the step 702 that an end user has accessed or selected the content, then the template of the live content viewer is transmitted to and loaded on the end user's computer system 152 or 154, at the step 704. At the step 706, the live content is then distributed to be displayed on the end user's computer system 152 or 154 within the live content viewer 400. At the step 708, the other associated information to be displayed with the live content is then distributed to be displayed on the end user's computer system 152 or 154 within the appropriate windows of the live content viewer 400.

At the step 710, it is determined if an audio stream is be part of the content or other associated information. If it is determined at the step 710 that audio stream is to be part of the content, then the audio information is distributed to be played by the end user's computer system 152 or 154. Otherwise, if it is determined at the step 710 that an audio stream is not be part of the content or after the step 712 is completed, then it is determined at the step 714 if the content is completed or if the user has disabled or closed the live content viewer 400. Once it is determined at the step 714 that the content is completed or that the user has disabled or closed the live content viewer 400, then the distribution process of FIG. 7 ends at the step 716.

In the manner described herein, the live content information system 100 of the present invention is used to register, promote and distribute true live content, pseudo-live content and on-demand content. The live content information system 100 associates a registration number with the live content. The live content is integrated into an overall presentation that includes auxiliary content which enhances the primary content and the end user's experience. The content and the overall presentation or selective portions of the presentation can be exchanged between the internet and non-internet sources such as television and radio. The live content information system of the present invention preferably provides a method of quickly promoting the content and drawing an audience of end users for the live content. This promotion method includes providing snapshots or a portion of the content which is integrated into a promotional viewer and distributed to advertise the content. The live primary content and auxiliary content are integrated and distributed within a live content viewer. The live primary content and auxiliary content are distributed from the appropriate sources to be displayed at the end user's computer system or other reception device within the live content viewer.

In one embodiment, content such as that described above (e.g., content streams) can be received at a central location (e.g., a website) from various content promoters/content sources. The content can then be registered at the site by receiving certain information from a user (e.g., the source location of the content, start and stop time, technical characteristics, etc.). The website can then be used to implement a guide to promote the distribution of this content (e.g., over the Internet, wirelessly, etc.). In one embodiment, the guide provides an indication of content that is currently live (as opposed to content that was aired live at some time in the past, for example). In one embodiment, currently live content might be denoted on the guide with a blinking "L." In this manner, a user visiting the site can easily identify currently live content. In one embodiment, the guide would be updated as new content is uploaded to/registered with the site.

Figure 8:
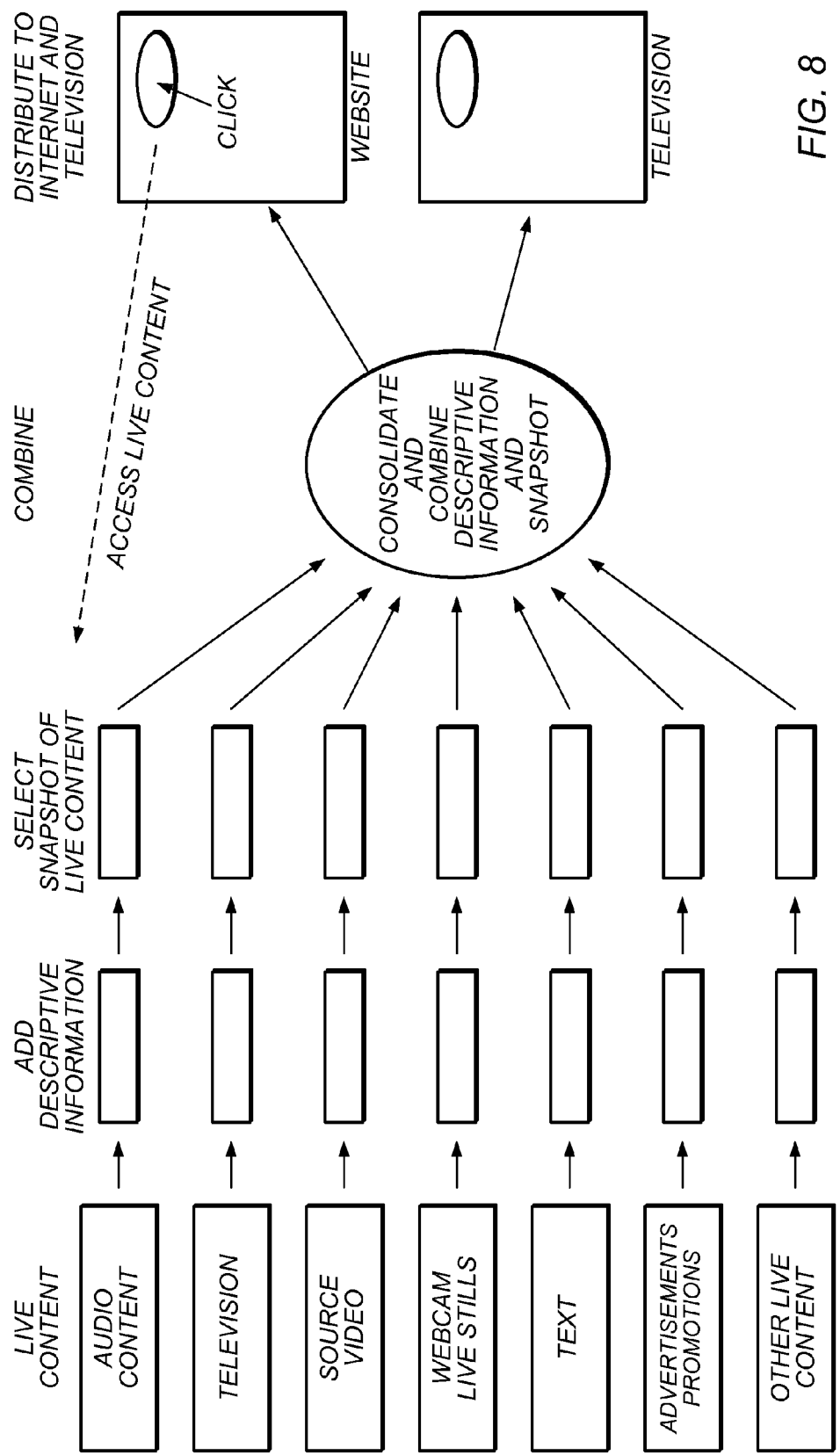
FIG. 8 illustrates one embodiment of processes that are associated with a content information system.

Additional Embodiments of the Live Content Information System Including Content Descriptor, Content Publisher, Content Aggregator, Content Distributor, and Content Access Method In some embodiments, this Content Information System (CIS) is designed for use with live content, which means content that is occurring at a particular moment in time, and is generally associated with a live event that is happening. (See FIG. 8.) The system has the following stages:

Add Descriptive Information

Certain descriptive information is added regarding the live content, and this information describes the live content both for the eventual end-user of the system as well as internal information that the system will interpret. Included in this descriptive information is:

The type of content (audio, video, still photos, text, etc.).

The technical characteristics of the content.

Information which makes the information more useful including the source of the content.

Time characteristics including what is going to occur and what has occurred.

Any associated information which will be published alongside the actual content.

Select Snapshot of the Information

This step includes selection of a partial amount of the content, which can be anything from a very small fraction of the actual live content to the full live content. The system will record the snapshot and include it alongside the Descriptive Information. A snapshot can include:

For any visual media such as video or "webcams", the snapshot can be a pre-determined "frame rate" or subset of the actual complete images from the live content. For example, it might be one visual frame every 1 minute for a video that has 30 frames per second, as an example. Or, the operator of the Live CIS may select certain live images to include in the Live CIS after viewing the images.

For text or copy, the snapshot may be anything from the full scrolling text, to only pre-selected pieces or parts of the text.

For audio, this may be the full live audio content, or parts of the audio content.

Combine Descriptive Information and Live Content Snapshot

At this point, various descriptive information and snapshots can be combined by the Live CIS into one cohesive presentation for the end-user of the Live CIS. Because each party involved in the production of the Live CIS has followed the same rules regarding the assembly of the parts of the Live CIS, these various Descriptive Information and Live Content Snapshots are able to be used by the same system. The next steps include:

Assembly by the Live CIS of the relevant parts for an end-user product.

Figure 9:
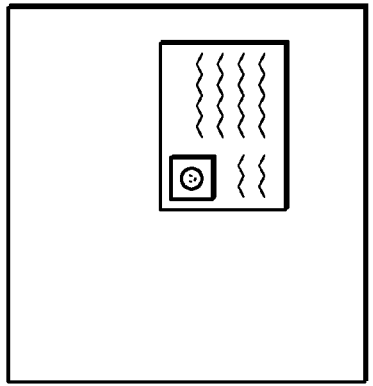
FIG. 9 illustrates a number of different possibilities for the distribution of an end-user product.
Figure 9:
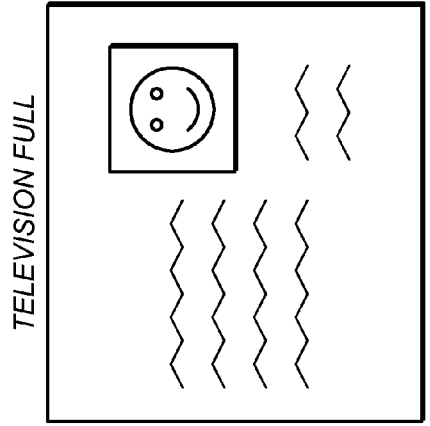
Figure 9:
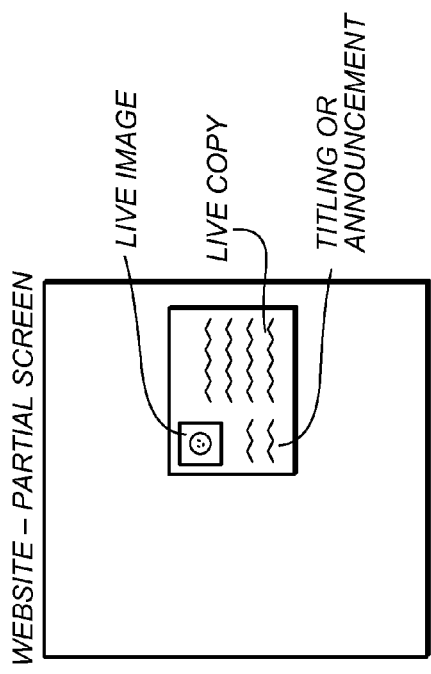
Figure 9:
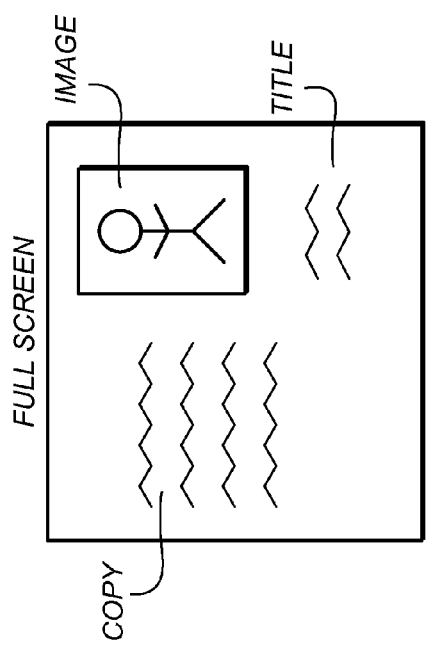

Delivery of the end-user product to a medium that can handle the audio/visual content of the end-user product of a Live CIS. (See FIG. 9 for illustration of possibilities for the distribution of the end-user product.) This includes delivery to World Wide Web Sites and delivery to television programming for inclusion on a television screen. This end-user product may be available at hundreds or thousands of places, through syndication or distribution methods.

The Live CIS end-user product can either take over part of the screen on which it resides, or all of the screen.

The end-user product is then resident on many Websites and television programs which will distribute the end-user product to end-users, who will watch the end-user product, and then interact with it when they see or hear a type of Live Content which interests them.

These end-user products are then shared and swapped among the producers of the Live CIS, because they have all followed the same rules. This way, multiple parties can be involved in the creation of one Live CIS, and multiple parties can work with each other to use the Live CIS when they need it the most.

One Embodiment of a Livecast Tool

Imagine:

A simple tool that the guy in the trenches of a live event can use to promote/communicate the event in real time (i.e. "this is going on right now").

That tool combines some moving text, still photo, and can have audio.

Livecast then "distributes" that little event promoter on hundreds of targeted sites, whatever is appropriate for the moment (Example: The Temptations are chatting now, would be different promotion than Bruce Springsteen is performing now). We can increase an audience by X, and even if the target audience doesn't click on the event promoter—there is still a little taste of the real event and the branding the sponsor wants, with a targeted audience.

Imagine the Livecast logo as an @ sign but with an L, and it blinks when something is "really live".

Livecast.com could consolidate all these little event promoters, then when you look at livecast.com the ones with the blinking logos are "really live".

This same little promoter can be used to sell the products as well.

We now have the Livecast Promotion and Distribution Network—the hub of the live event/broadcasting industry.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is accessible over the internet through the public switched telephone network, the present invention could also be accessible on any other appropriate communication structures, including intranets, direct connections and the like. Further, it will also be apparent to those skilled in the art that while the preferred embodiment of the present is utilized to register, promote and distribute live content, the present invention could also be used to register, promote and distribute other appropriate recorded and archival content.

What is claimed is:

1. A live content information system, comprising:

an Internet server coupled to the Internet;

a registration module that:

registers a plurality of Internet broadcast events in response to corresponding registration requests received via the Internet through the Internet server from one or more content providers;

issues registration information for the plurality of Internet broadcast events to the one or more content providers, wherein the registration information includes information indicating an Internet source location of a first of the plurality of Internet broadcast events from which a browser on a client computer system can directly access the first Internet broadcast event via the Internet, wherein the Internet source location is remote with respect to the live content information system, and wherein the live content information system is remote with respect to the client computer system;

manages information relating to ownership of live content corresponding to the first Internet broadcast event; and manages levels of access to change one or both of the live content and information associated with the live content;

a tracking module that checks for a change in status of the first Internet broadcast event, and in response to the change in status of the first Internet broadcast event communicates the change in status to one or more parties; and a sponsorship module that provides information about the plurality of Internet broadcast events to facilitate matching of one or more sponsors with at least one of the one or more content providers, wherein the information about the plurality of Internet broadcast events is received from the one or more content providers;

wherein the live content information system:

uses a vocabulary that includes characteristics received from the one or more content providers, wherein the received characteristics describe: technical characteristics of the live content, one or both of a start time and a stop time of the live content, and information indicating that the live content is broadcast live, wherein the technical characteristics of the live content include information describing the file format of the live content; and provides guide information through the Internet server to the browser of the client computer system, wherein the provided guide information is displayable via the browser of the client computer system to identify two or more of the plurality of Internet broadcast events and to indicate that at least the first Internet broadcast event is currently being broadcast live via the Internet and wherein the provided guide information is usable by the browser of the client computer system to access the first Internet broadcast event directly from its Internet source location.

2. The live content information system of claim 1, wherein the registration information also includes timing information indicating a period of time in which the first Internet broadcast event will be available as a live broadcast via the Internet, wherein a first of the registration requests corresponds to the first Internet broadcast event, wherein the first registration request includes said timing information and said Internet source location.

3. The live content information system of claim 2, wherein the live content information system:

updates the guide information to indicate that the first Internet broadcast event is no longer live based on one or both of the timing information and the change in status detected by the tracking module.

4. The live content information system of claim 1, wherein a first content stream corresponding to the first Internet broadcast event is not received or stored in the live content information system, wherein the first content stream includes video, and wherein, for each of the two or more Internet broadcast events, the guide information includes a hyperlink for accessing that Internet broadcast event and descriptive text for that Internet broadcast event.

5. The live content information system of claim 1, wherein a first of the registration requests corresponds to the first Internet broadcast event, wherein the first registration request includes an indication of the kind of technology required to view or play a content stream corresponding to the first Internet broadcast event.

6. The live content information system of claim 1, wherein a second of the two or more Internet broadcast events is a pseudo live broadcast.

7. The live content information system of claim 1, wherein the registration request that corresponds to the first Internet broadcast event is received while the first Internet broadcast event is in progress.

8. The live content information system of claim 1, wherein the registration request that corresponds to the first Internet broadcast event is received from a second client computer system located at a physical location of the first Internet broadcast event, wherein an operator of the second client computer system is a party with an interest in promoting the first Internet broadcast event.

9. The live content information system of claim 1,
wherein the guide information includes links to two or more Internet source locations corresponding respectively to the two or more Internet broadcast events;
wherein, for each of the two or more Internet broadcast events, the guide information is displayable by the client computer system to indicate whether or not that Internet broadcast event is currently being broadcast live via the Internet; and
wherein the registration request for the first Internet broadcast event includes information indicating a solicitation for sponsorship of the first Internet broadcast event.

10. The live content information system of claim 1, wherein a portion of the guide information that corresponds to the first Internet broadcast event includes an event promoter, wherein the event promoter includes: one or more textual descriptions of the first Internet broadcast event, and selected portions of a content stream corresponding to the first Internet broadcast event.

11. The live content information system of claim 10, wherein the event promoter is configured for download to and viewing on the client computer system.

12. The live content information system of claim 1, wherein the client computer system is an arbitrary web-browser-equipped computer system.

13. The live content information system of claim 1, wherein the live content information system:
automatically updates the guide information, wherein said automatically updating includes changing the guide information to indicate that the first Internet broadcast event is no longer live.

14. The live content information system of claim 1, wherein the registration request that corresponds to the first Internet broadcast event includes information indicating the start time and the stop time for the first Internet broadcast event.

15. The live content information system of claim 1, wherein the registration request that corresponds to the first Internet broadcast event includes timing information indicating when one or more subevents are to occur within the first Internet broadcast event.

16. The live content information system of claim 1, wherein the live content information system:
receives sponsor information via the Internet and through the Internet server from a party with an interest in sponsoring the first Internet broadcast event, wherein a portion of the guide information that corresponds to the first Internet broadcast event includes the sponsor information.

17. A method, comprising:
an Internet server receiving a plurality of registration requests via the Internet from one or more content providers, wherein the Internet server is part of a live content information system that includes a registration module, a tracking module, and a sponsorship module;
the registration module registering a plurality of Internet broadcast events based on the received plurality of registration requests received via the Internet;
the registration module issuing registration information for the plurality of Internet broadcast events to the one or more content providers, wherein the registration information includes information indicating an Internet source location of a first of the plurality of Internet broadcast events from which a browser on a client computer system can directly access the first Internet broadcast event via the Internet, wherein the Internet source location is remote with respect to the live content information system, and wherein the live content information system is remote with respect to the client computer system;
the registration module managing information relating to ownership of live content corresponding to the first Internet broadcast event, and managing levels of access to change one or both of the live content and information associated with the live content;
the tracking module checking whether a change in status of the first Internet broadcast event has occurred, and in response to detecting the change in status communicating the change in status to one or more parties; and
the sponsorship module providing information about the plurality of Internet broadcast events to facilitate matching of one or more sponsors with at least one of the one or more content providers, wherein the information about the plurality of Internet broadcast events is received from the one or more content providers;
wherein the live content information system:
uses a vocabulary that includes characteristics received from the one or more content providers, wherein the received characteristics describe: technical characteristics of the live content, one or both of a start time and a stop time of the live content, and information indicating that the live content is broadcast live, wherein the technical characteristics of the live content include information describing the file format of the live content; and
provides guide information through the Internet server to the browser of the client computer system, wherein the provided guide information is displayable via the browser of the client computer system to identify two or more of the plurality of Internet broadcast events and to indicate that at least the first Internet broadcast event is currently being broadcast live via the Internet, and wherein the provided guide information is usable by the browser of the client computer system to access the first Internet broadcast event directly from its Internet source location.

18. The method of claim 17, wherein a content stream corresponding to the first Internet broadcast event includes video.

19. The method of claim 17, wherein a content stream corresponding to the first Internet broadcast event includes a live chat session.

20. The method of claim 17, wherein the registration request that corresponds to the first Internet broadcast event includes timing information indicating at least the start time for a content stream corresponding to the first Internet broadcast event.

21. The method of claim 20, further comprising: updating the guide information so that the guide information is displayable to indicate that a different set of two or more of the plurality of Internet broadcast events are currently being broadcast live via the Internet.

22. The method of claim 17, wherein a content stream corresponding to the first Internet broadcast event is a video stream, wherein the registration request that corresponds to the first Internet broadcast event includes a frame rate of the video stream.

23. The method of claim 17, wherein the indication that at least the first Internet broadcast event is currently being broadcast live via the Internet includes a separate indication for each of those Internet broadcast events.

24. The method of claim 17, wherein a second of the two or more Internet broadcast events is currently a pseudo live broadcast.

25. The method of claim 17, wherein a second of the two or more Internet broadcast events has not yet started, wherein broadcast of the second Internet broadcast event is hosted by the live content information system.

26. The method of claim 17, wherein the registration request corresponding to the first Internet broadcast event is received while the first Internet broadcast event is in progress.

27. The method of claim 17, wherein the registration request corresponding to the first Internet broadcast event is received from a second client computer system located at a physical location of the first Internet broadcast event, wherein an operator of the second client computer system is a party with an interest in promoting the first Internet broadcast event.

28. The method of claim 17,
wherein the guide information includes links to two or more Internet source locations corresponding respectively to the two or more Internet broadcast events;
wherein, for each of the two or more Internet broadcast events, the guide information is displayable by the client computer system to indicate whether or not that Internet broadcast event is currently being broadcast live via the Internet; and
wherein the registration request for the first Internet broadcast event includes information indicating a solicitation for sponsorship of the first Internet broadcast event.

29. The method of claim 17, wherein a portion of the guide information that corresponds to the first Internet broadcast event includes an event promoter, wherein the event promoter includes: one or more textual descriptions of the first Internet broadcast event, and selected portions of a content stream corresponding to the first Internet broadcast event.

30. The method of claim 29, wherein the event promoter is configured for download to and viewing on the client computer system.

31. The method of claim 17, wherein the client computer system is an arbitrary web-browser-equipped computer system.

32. The method of claim 17 further comprising: the live content information system automatically updating the guide information, wherein said automatically updating includes changing the guide information so that the guide information is displayable by the client computer system to indicate that the first Internet broadcast event is not currently live.

33. The method of claim 17, wherein the registration request corresponding to the first Internet broadcast event includes the start time and the stop time for the first Internet broadcast event.

34. The method of claim 17, wherein the registration request corresponding to the first Internet broadcast event includes timing information indicating when one or more subevents are to occur within the first Internet broadcast event.

35. The method of claim 17 further comprising:
the live content information system receiving sponsor information via the Internet from a party with an interest in sponsoring the first Internet broadcast event, wherein a portion of the guide information corresponding to the first Internet broadcast event includes the sponsor information.

36. A live content information system comprising:
first means for coupling to the Internet;
second means for registering a plurality of Internet broadcast events based on corresponding registration requests received by the first means via the Internet from one or more content providers, and issuing registration information for the plurality of Internet broadcast events to the one or more content providers, wherein the registration information includes information indicating an Internet source location of a first of the plurality of Internet broadcast events from which a browser on a client computer system can directly access the first Internet broadcast event via the Internet, wherein the Internet source location is remote with respect to the live content information system, and wherein the live content information system is remote with respect to the client computer system;
third means for managing information relating to ownership of live content corresponding to the first Internet broadcast event, and for managing levels of access to change one or both of the live content and information associated with the live content;
fourth means for checking whether a change in status of the first Internet broadcast event has occurred, and in response to the change in status communicating the change in status to one or more parties; and
fifth means for providing information about the plurality of Internet broadcast events to facilitate matching of one or more sponsors with at least one of the one or more content providers, wherein the information about the plurality of Internet broadcast events is received from the one or more content providers;
wherein the live content information system:
uses a vocabulary that includes characteristics received from the one or more content providers, wherein the received characteristics describe: technical characteristics of the live content, one or both of a start time and a stop time of the live content, and information indicating that the live content is being broadcast live, wherein the technical characteristics of the live content include information describing the file format of the live content; and
provides guide information through the first means to the browser of the client computer system, wherein the provided guide information is displayable via the browser of the client computer system to identify two or more of the plurality of Internet broadcast events and to indicate that at least the first Internet broadcast event is currently being broadcast live via the Internet and wherein the provided guide information is usable by the browser of the client computer system to access the first Internet broadcast event directly from its Internet source location.

* * * * *

UNITED STATES PATENT AND TRADEMARK OFFICE
CERTIFICATE OF CORRECTION

| | | |
|---|---|---|
| PATENT NO. | : 7,788,686 B1 | |
| APPLICATION NO. | : 09/797080 | |
| DATED | : August 31, 2010 | |
| INVENTOR(S) | : Christopher C. Andrews | |

It is certified that error appears in the above-identified patent and that said Letters Patent is hereby corrected as shown below:

Title Page, Item (57) Abstract:

Please delete "An electronic program guide that assists a user to navigate through a variety of digital and analog feeds made available by digital television technology is provided. Features such as allowing the user to purchase items, allowing the user to choose the content of the display screen, enabling more efficient use of black areas, among others are provided. Default settings based on prior user settings is provided to allow for an automatically customized environment. This automatic customization may entail, for example, the automatic resizing of windows based on the user's prior preferences. Also provided is a feature that allows for the automatic activation of a local or remote application through the user's set-top box based on the content currently being viewed."
and substitute -- A live content information system is used to register, promote and distribute true live content, pseudo-live content and on-demand content. The live content information system associates a registration number with the content. The live content is integrated into an overall presentation that includes auxiliary content. Snapshots or a portion of the content is integrated into a promotional viewer and distributed to advertise the content. The live primary content and auxiliary content are integrated and distributed within a live content viewer. The live primary content and auxiliary content are distributed from the appropriate sources to be displayed at the end user's computer system within the live content viewer. The live content information system also allows a producer of live content to be connected to one or more sponsors who will pay money for sponsoring the distribution of live content. The live content information system also allows live content to be quickly and easily interchanged between a producer of the live content and a partner such as a syndicator, distributor, affiliate and sponsor. --

Signed and Sealed this
Twenty-ninth Day of March, 2011

David J. Kappos
*Director of the United States Patent and Trademark Office*